United States Patent [19]
Kawagishi et al.

[11] Patent Number: 5,347,379
[45] Date of Patent: Sep. 13, 1994

[54] LIQUID CRYSTAL DEVICE WITH MIM INSULATOR FORMED AS A CONTINUOUS MONOMOLECULAR FILM

[75] Inventors: Hideyuki Kawagishi, Ayase; Kiyoshi Takimoto, Kawasaki; Haruki Kawada, Yokohama; Hiroshi Matsuda, Isehara; Yoshihiro Yanagisawa, Atsugi, all of Japan

[73] Assignee: Canon Kabushiki Kaisha, Tokyo, Japan

[21] Appl. No.: 150,264

[22] Filed: Nov. 10, 1993

Related U.S. Application Data

[63] Continuation of Ser. No. 710,404, Jun. 5, 1991, abandoned.

[30] Foreign Application Priority Data

Jun. 7, 1990 [JP] Japan ................................. 2-147313
Jun. 7, 1990 [JP] Japan ................................. 2-147316
May 17, 1991 [JP] Japan ................................. 3-140733

[51] Int. Cl.$^5$ .................. G02F 1/1343; G02F 1/1337
[52] U.S. Cl. ...................................... 359/58; 359/60; 359/75
[58] Field of Search .................. 359/54, 55, 58, 75, 359/76, 57, 60; 257/30, 40

[56] References Cited

U.S. PATENT DOCUMENTS

| | | | |
|---|---|---|---|
| 4,153,529 | 5/1979 | Little et al. | 359/76 |
| 4,712,872 | 12/1987 | Kanbe et al. | 359/58 |
| 4,941,735 | 7/1990 | Moddel et al. | 359/72 |
| 5,009,489 | 4/1991 | Eguchi et al. | 350/341 |
| 5,020,881 | 6/1991 | Matsuda et al. | 350/333 |
| 5,046,822 | 9/1991 | Matsuda et al. | 359/75 |
| 5,057,878 | 10/1991 | Goddes et al. | 257/30 |
| 5,072,262 | 12/1991 | Uekita et al. | 357/23.15 |
| 5,077,762 | 12/1991 | Morimoto et al. | 257/30 |
| 5,093,742 | 3/1992 | Okamoto et al. | 359/75 |
| 5,155,566 | 10/1992 | Nahayama et al. | 257/40 |

FOREIGN PATENT DOCUMENTS

| | | | |
|---|---|---|---|
| 0038920 | 2/1988 | Japan | 359/58 |
| 0172817 | 7/1989 | Japan | 359/76 |
| 0243025 | 9/1989 | Japan | 359/75 |
| 0123318 | 5/1991 | Japan . | |

OTHER PUBLICATIONS

Japanese Journal of Applied Physics, vol. 27, No. 4 (1988) 475:6.
Patent Abstracts of Japan, vol. 12, No. 249 (1988) P-730.
Patent Abstracts of Japan, vol. 13, No. 482 (1989) P-953.
Patent Abstracts of Japan, vol. 13, No. 475 (1989) P-950.
Patent Abstracts of Japan, vol. 13, No. 96 (1989) P-839.
Patent Abstracts of Japan, vol. 15, No. 16 (1991) P-1152.

*Primary Examiner*—William L. Sikes
*Assistant Examiner*—Kenneth Parker
*Attorney, Agent, or Firm*—Fitzpatrick, Cella, Harper & Scinto

[57] ABSTRACT

A liquid crystal device comprising a pair of substrates each having an electrode, and a liquid crystal layer having a chiral smectic phase, provided between the substrates, wherein a first substrate which is one of the substrates comprises; i) a plurality of first electrodes dividedly disposed, the plurality of first electrodes being covered with a monomolecular film or monomolecular built-up film in such a way that the monomolecular film or monomolecular built-up film provided on the first electrodes and between the first electrodes is formed in a continuous film; and ii) a second electrode provided on the monomolecular film or monomolecular built-up film in such a way that an MIM device is formed at the part where the first electrodes, the monomolecular film or monomolecular built-up film and the second electrode overlap in layers.

5 Claims, 6 Drawing Sheets

LIQUID CRYSTAL DEVICE WITH MIM INSULATOR FORMED AS A CONTINUOUS MONOMOLECULAR FILM

This application is a continuation of application Ser. No. 07/710,404, filed Jun. 5, 1991, now abandoned.

BACKGROUND OF THE INVENTION

1. Field of the Invention

The present invention relates to a liquid crystal device applied to projection televisions, flat panel display systems, etc.

2. Related Background Art

In recent years, it is expected to accomplish a large-screen flat panel display system that utilizes high response and bistability inherent in ferroelectric liquid crystals (FLC).

Display panels making use of such ferroelectric liquid crystals (FLC) are comprised of a cell with a very small thickness usually of 1 μm to 2 μm, which is approximately 1/10 to 1/5 of that in TN (twisted nematic) type liquid crystal panels. Since a high voltage usually of about 27 V is used as a drive voltage at the time of selection, they also use as an insulating layer a sputter film formed of $SiO_2$ or $Ta_2O_5$, endurable to an electric field of as high as about $2 \times 10^7$ V/m which is beyond comparison with that of the TN type liquid crystal panels.

As for methods of fabricating MIM devices provided in such liquid crystal panels, it has been hitherto well known to use anodic oxidation that can selectively oxidize a metal portion of the anode.

However, when the MIM devices are formed on such ferroelectric liquid crystal panels with the anodic oxidation method as mentioned above, the insulating layer at the part of liquid crystal has had to be formed using other process since only the metal portion is selectively oxidized.

In the sputter film formed of $SiO_2$, $Ta_2O_5$ or the like, pinholes may so frequently occur that the insulating film of MIM devices has been problematic in view of stability.

Thus, the ferroelectric liquid crystal devices having an MIM device have a high display quality level but on the other hand have had a disadvantage of high cost.

Faulty switching also has been found to occur at part of a ferroelectric liquid crystal layer when the layer is in a state in which a ferroelectric liquid crystal layer at a picture element area to which a voltage is applied and a ferroelectric liquid crystal layer located between picture elements, to which no voltage is applied, or at the area in which an MIM device is provided are adjoining. This faulty switching is caused by a peculiar polarized domain structure mainly resulting from the spontaneous polarization of a ferroelectric liquid crystal, and occurs more frequently when there is a greater difference in alignment between the ferroelectric liquid crystal layer at the picture element area and the ferroelectric liquid crystal layer at the non-picture element area.

The faulty switching is apt to unreasonably restrict design conditions such as driving voltage and driving frequency in matrix drive, and hence is undesirable for putting devices into practical use.

SUMMARY OF THE INVENTION

Accordingly, taking account of the above problems, a first object of the present invention is to provide a ferroelectric liquid crystal device having an MIM device, at a low cost and a high display quality level.

A second object of the present invention is to obtain a ferroelectric liquid crystal layer that is free from faulty switching regardless of picture element areas or non-picture element areas, and thus provide a ferroelectric liquid crystal that has satisfied uniform alignment over the whole area of a screen.

To achieve the above objects, the present invention provides a liquid crystal device comprising a pair of substrates each having an electrode, and a liquid crystal layer having a chiral smectic phase, provided between said substrates, wherein a first substrate which is one of said substrates comprises;

i) a plurality of first electrodes dividedly disposed, said plurality of first electrodes being covered with a monomolecular film or monomolecular built-up film in such a way that the monomolecular film or monomolecular built-up film provided on said first electrodes and between said first electrodes is formed in a continuous film; and ii) a second electrode provided on said monomolecular film or monomolecular built-up film in such a way that an MIM device is formed at the part where said first electrodes, said monomolecular film or monomolecular built-up film and said second electrode overlap in layers.

DESCRIPTION OF THE PREFERRED EMBODIMENTS

Because of the constitution employed in the present invention, the monomolecular film or monomolecular built-up film can have a stable function of insulation to the MIM device, which is attributable to the structure with less pinholes that is inherent in such film, so that a non-linearity with stable current-voltage characteristics can be imparted to the MIM device. The monomolecular film or monomolecular built-up film can also have a function of insulation that prevents a short from being caused by a high electric field applied to the ferroelectric liquid crystal.

The monomolecular film or monomolecular built-up film is formed on a plurality of electrodes corresponding with picture elements in such a way that the electrodes are completely covered and veiled with the film. Hence, the power to control the alignment of the monomolecular film or monomolecular built-up film has a good influence also on the ferroelectric liquid crystal layer at the non-picture element area, and contributes uniform alignment of the ferroelectric liquid crystal layer regardless of picture element areas and non-picture element areas.

Thus, it is unnecessary to separately form insulating layers at an FLC device area and an MIM device area as in a conventional liquid crystal device. Hence, a stable function of insulation can be exhibited using an inexpensive constitution. A high function of alignment that prohibits faulty switching from occurring at part of the ferroelectric liquid crystal layer within the areas of picture elements can be achieved, and hence display can be performed on a high quality level.

The FLC device of the present invention will be described below with reference to the accompanying drawings.

Figure 1:
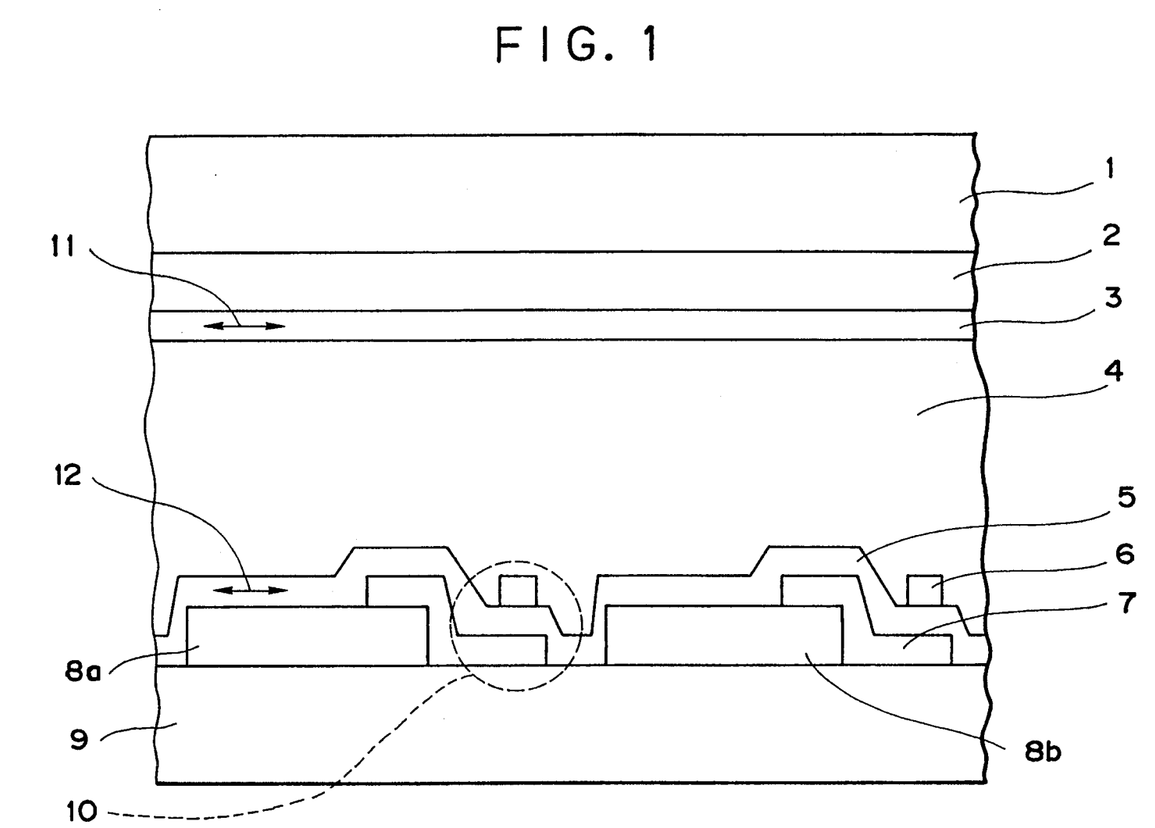
FIG. 1 is a partial cross section of a display panel according to an embodiment of the present invention.

FIG. 1 is a partial cross section of a display panel in which the present invention has been embodied, and best illustrates the feature of the present invention.

In FIG. 1, the numeral 1 denotes an upper substrate having an ITO electrode 2; 9, a lower electrode having an ITO electrode 8; 4, an FLC (ferroelectric liquid crystal) layer having a chiral smectic phase and held between these substrates 1 and 9; 3, a monomolecular film or monomolecular built-up film provided on the electrode 2 of the upper substrate; 5, a monomolecular film or monomolecular built-up film provided on the electrode 8 of the lower substrate; 6, a metal electrode, a second electrode, provided on part of the film 5; and 7, an electrode made of the same kind of metal as the metal electrode 6 and so formed as to be connected with the electrode 8, thus forming what is called an MIM device portion 10 together with the metal electrode 6 interposing the film 5. The electrode 7 is provided for the purpose of removing, in particular, the rectification properties of the MIM device portion 10.

The electrode 8 is formed in plurality (electrodes 8a, 8b and so forth in the drawing) corresponding with picture elements. The first electrode is comprised of the electrodes 7 and 8.

In the embodiment shown in FIG. 1, the monomolecular film or monomolecular built-up film 5 serving as an aligning film is in direct contact with a picture element area and an area located between picture elements (except for the upper area of the metal electrode 6) of the FLC layer 4. Hence, the FLC layer 4 at the picture element area and non-picture element area can be aligned in a uniform state, and thus the faulty switching can be prohibited from occurring at part of the FLC layer within the areas of picture elements.

The films 3 and 5 have the axes in the direction of which they have been drawn up (i.e., drawing-up axes), that are parallel or reversely parallel to each other as shown by arrows 11 and 12. Hence they have functions as aligning films that can bring the alignment direction of FLC molecules into line with a summary drawing-up axes without rubbing.

Figure 5:
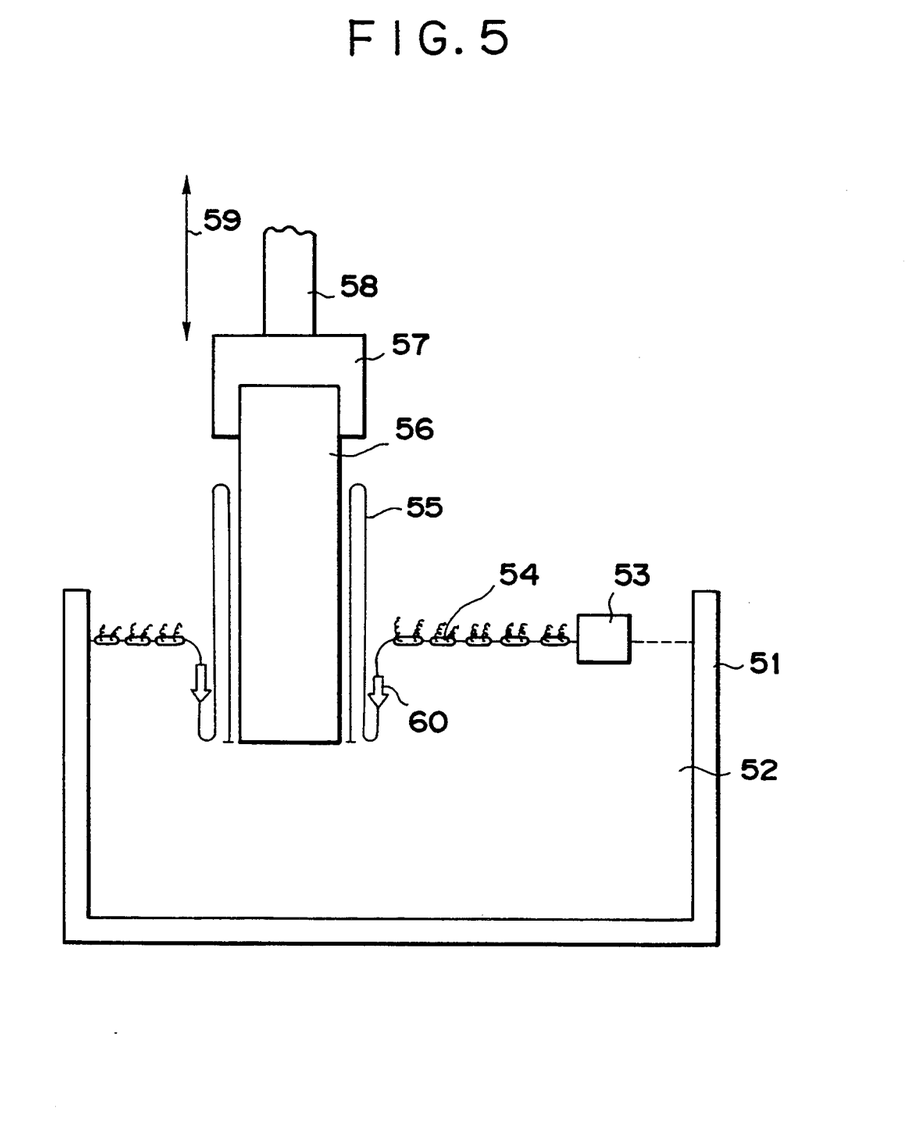
FIG. 5 illustrates a method of preparing a monomolecular film or monomolecular built-up film by the LB process.

FIG. 5 illustrates a method of preparing a monomolecular film and a monomolecular built-up film by the LB (Langmuir-Brodgett) process. The numeral 51 denotes a trough (a water tank); 52, a liquid (pure water); 54, a monomolecular film spread on the water surface; 53, a movable barrier for keeping a surface pressure constant; 56, a substrate; 55, monomolecular films built up on the substrate; 57, a substrate fixture; and 58, a support rod that moves upward and downward.

Herein, the drawing-up axis refers to the direction in which the substrate is moved upward and downward as shown by the numeral 59 to form an LB film on the substrate. In the case of the monomolecular film, the direction in which the substrate is drawn up is meant to be the direction from a position at which the film forming is finished on the substrate to a position at which it is started, and, in the case of the monomolecular built-up film, the direction 60 of an uppermost layer of built-up films among the directions along build-up courses that follow from a position at which the film forming is finished on the substrate to a position at which it is started.

The LB film thus formed, which serves as an excellent insulating film to the FLC device constituted of the electrodes 2 and 8 and the FLC layer 4, has a function of preventing a short from being caused by a high electric field.

The MIM device portion 10 is formed of the metal electrode 6, the film 5 and the electrode 7, and hence can stably operate by the action of insulation inherent in the monomolecular film or monomolecular built-up film having homogeneous structure and less pinholes.

Since the MIM device portion 10 is connected with the FLC device comprised of the electrodes 2 and 8 and the FLC layer 4, it also becomes possible to accomplish a ferroelectric liquid crystal device making the most of the memory performance of FLC and the non-linearity of the MIM device, and having a high display quality level with a high-speed display and a high image quality.

In the present invention, the monomolecular films or monomolecular built-up films 3 and 5 are formed by the LB process. The LB process is a process of making a monomolecular film or a built-up film thereof by utilizing the mechanism that when the hydrophilic part and hydrophobic part are appropriately balanced (i.e. amphiphatic balance) in a structure having the both parts in the molecule, the molecules form a monomolecular layer on a water surface with its hydrophilic group downward.

The group that constitutes the hydrophobic part includes all sorts of hydrophobic groups such as saturated or unsaturated hydrocarbon groups, condensed polycyclic aromatic groups and chain polycyclic phenyl groups, which are commonly well known in the art. These each constitute the hydrophobic part alone or in combination of plural ones. As for the group most typical as a component for the hydrophilic part, it may include hydrophilic groups as exemplified by a carboxyl group, an ester group, an acid amido group, an imido group, a hydroxyl group, and amino group (primary, secondary, tertiary, and quaternary). These also each constitute the hydrophilic part alone or in combination of plural ones.

Molecules having these hydrophobic groups and hydrophilic groups in a good balance can form the monomolecular film on a water surface. This film can be a material very preferred for the present invention.

As examples of such molecules, the following macromolecules can be exemplified.

(I) Addition polymers:

1) Polyacrylic acid

2) Polyacrylate

-continued

3) Acrylic acid copolymer

4) Acrylate copolymer

5) Polyvinyl acetate

6) Vinyl acetate copolymer (II) Condensation polymers:

1) Polyimide

2) Polyamide

3) Polycarbonate (III) Ring opening polymers:

1) Polyethylene oxide

-continued

In the above, $R_1$ represents those corresponding to groups having a $\sigma$-electron level, and a long-chain alkyl group introduced so that the monomolecular film can be readily formed on the water surface, which alkyl group preferably has a carbon atom number n of $5 \leq n \leq 30$.

$R_2$ represents a short-chain alkyl group having a carbon atom number n of $1 \leq n \leq 4$. The degree of polymerization represented by m should preferably be $100 \leq m \leq 5000$.

The compounds set forth in the above as examples are shown only by their basic structures. It is needless to say that various substituted compounds of these polymers can also be preferably used in the present invention.

To form the FLC layer 4, a liquid crystal having a chiral smectic phase is used so that ferroelectric properties can be exhibited.

The FLC layer may preferably have a thickness (a cell gap) of 1 μm to 5 μm.

Figure 4:
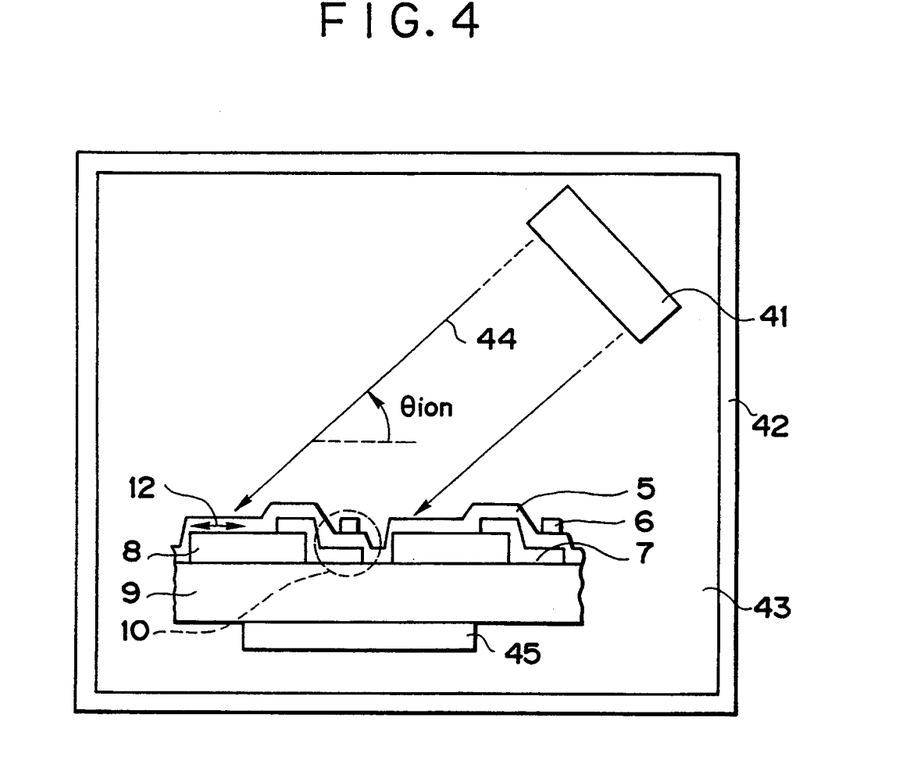
FIG. 4 is a diagrammatic view to illustrate oblique irradiation with an ion beam on an LB film.

The monomolecular film or monomolecular built-up film may be obliquely irradiated with an ion beam. FIG. 4 is a diagrammatic view to illustrate oblique irradiation with an ion beam on the LB film. The numeral 41 denotes an ion beam emission source; 42, a vacuum chamber; and 43, the interior of the vacuum chamber. When the LB film is irradiated with an argon ion beam, the vacuum chamber is evacuated to a highly vacuum state using an exhaust system, and then brought into a state in which argon gas has been introduced. The numeral 44 indicates the direction of irradiation, noted as an average direction of ion beams shed forward. The mark θdion represents an irradiation angle of the ion beam with respect to the substrate 9. The numeral 45 denotes a pedestal for securing the substrate 9.

In FIG. 4, an accelerator, the vacuum system, etc. are omitted from illustration.

Figure 2:
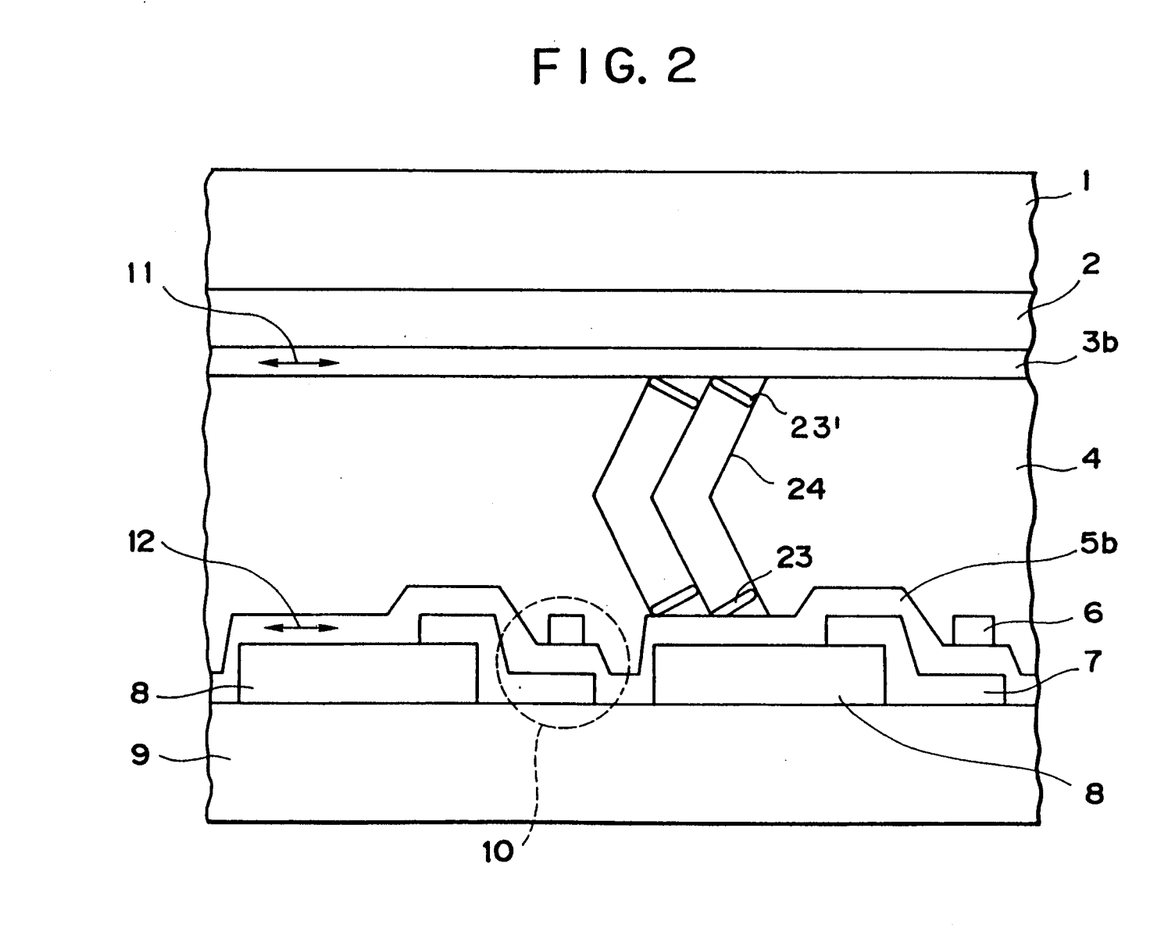
FIG. 2 is a partial cross section of a display panel according to another embodiment of the present invention.

This irradiation with an ion beam is effective for increasing pre-tilt angle attributable to monomolecular films 3b and 5b (FIG. 2). An FLC device thereby made to have a pre-tilt angle of not less than 2°, and preferably not less than 3°, can give an FLC device having been aligned in a higher contrast.

The direction of ion beam irradiation is so set that, particularly between the upper and lower substrates, the direction is symmetrical with respect to the substrate surfaces and also the components in the substrate surfaces become substantially parallel to each other. Namely, this makes it possible to control the alignment of FLC so that molecules 23' and 23 at the interfaces can have high pre-tilt angles and be substantially face-symmetrical with respect to the cell mid-plane. As shown in FIG. 2, a ferroelectric liquid crystal in such an FLC device has a chevron-shaped layer structure 24 in its SmC* phase, and is so controlled as to be in the alignment such that the major axes of the molecules at the interfaces are substantially parallel to the layer normal of the SmC* phase. Such alignment at a high pre-tilt angle brings about an increase in the apparent tilt angle, thus accomplishing bright, highly contrast FLC display.

Figure 3:
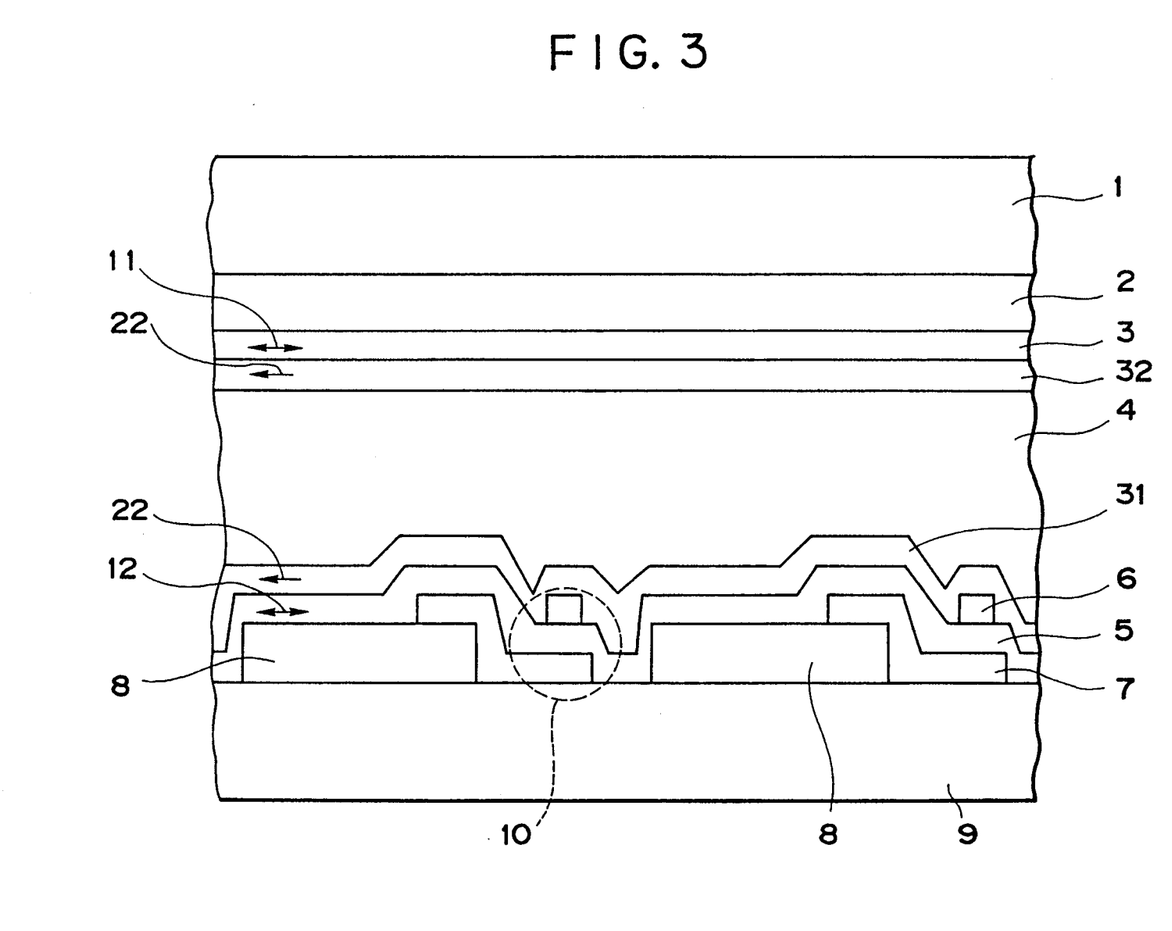
FIG. 3 is a partial cross section of a display panel according to still another embodiment of the present invention.

In the present invention, as shown in FIG. 3, an additional aligning film 31 may be further provided on the monomolecular film or monomolecular built-up film 5 of the present invention so long as the substrate on which the film 5 is formed in the state that the electrodes 8 are completely covered with it is used.

In that instance, as shown also in FIG. 3, the drawing-up axis 12 (or 11) and the rubbing axis 22 of the aligning film, or the drawing-up direction 22 when the aligning film is formed by the LB process, should be taken into account. That is, the drawing-up axis 12 (or 11) and the rubbing axis or drawing-up direction 22 should be so adjusted that they are in parallel. Since the upper and lower substrates can thereby be made more symmetrical, the upper and lower substrates can be prepared from one glass plate and then cut into two plates, and thus it becomes possible to provide a process suited for mass production.

EXAMPLES

The present invention will be described below by giving Examples.

Example 1

The liquid crystal device as shown in FIG. 1 was prepared.

Here, a polyimide LB film was used to obtain the films 3 and 5, which was prepared by spreading a polyimide precursor over a water surface, moving a substrate alternately twelve times downward and upward crossing the water face at a surface pressure of about 25 dyne/cm and a speed of 4 mm/min to transfer the precursor to the substrate, followed by baking for 10 minutes in a electric furnace of 300° C. to effect imidization, thus giving a polyimide LB film comprised of 24 layers.

To form the FLC layer 4, a ferroelectric liquid crystal CS1014 (trade name; available from Chisso Corporation) was particularly used, and was made to have a thickness (a cell gap) of 1.5 $\mu$m.

Here, each MIM device was made to have a joint area of 10 $\mu$m $\times$ 10 $\mu$m, and each picture element, an area of 250 $\mu$m $\times$ 250 $\mu$m.

A liquid crystal device having achieved the objects of the present invention was thus obtained.

Example 2

The liquid crystal device as shown in FIG. 2 was prepared.

This display panel is the same as Example 1 described above, except that films 3b and 5b each having a pre-tilt angle of not less than 2°, and preferably not less than 3°, were used as the monomolecular film or monomolecular built-up film. The films 3b and 5b are polyimide LB films prepared in the same manner as in Example 1 except that the films were built up to have 30 layers. The films were obliquely irradiated with an ion beam.

Irradiation with an ion beam was carried out using argon ions, for 5 seconds at an accelerating voltage of 1 kV, setting to 27.5° the irradiation angle with respect to the substrate, and from such a position that the drawing-up directions of the LB films (films 3b and 5b) and the substrate surface components in the irradiation direction can be substantially in parallel.

Example 3

The liquid crystal device as shown in FIG. 3 was prepared.

This device was prepared in the same manner as in Example 1 except that a liquid-crystal aligning film 31 was provided on the LB film 5 and the second electrode 6.

A liquid-crystal aligning film 32 was also provided on the opposing substrate side.

A polyimide LB film LQ1802 (trade name; available from Hitachi Chemical Co., Ltd.) was used to form the aligning films 31 and 32, which were so disposed that their drawing-up directions became parallel to each other.

In the embodiment shown in FIG. 3, the aligning films were so disposed that the drawing-up axis 12 (or 11) and the drawing-up direction 22 became parallel. Hence, the power of the LB film 5 (or 3) to indirectly control the monoaxial aligning of FLC and the power of the LB aligning film 31 (or 32) to directly control the monoaxial aligning of FLC were cooperated to improve the homogeneousness in the alignment of FLC in the FLC cell.

Comparative Example 1

Figure 6:
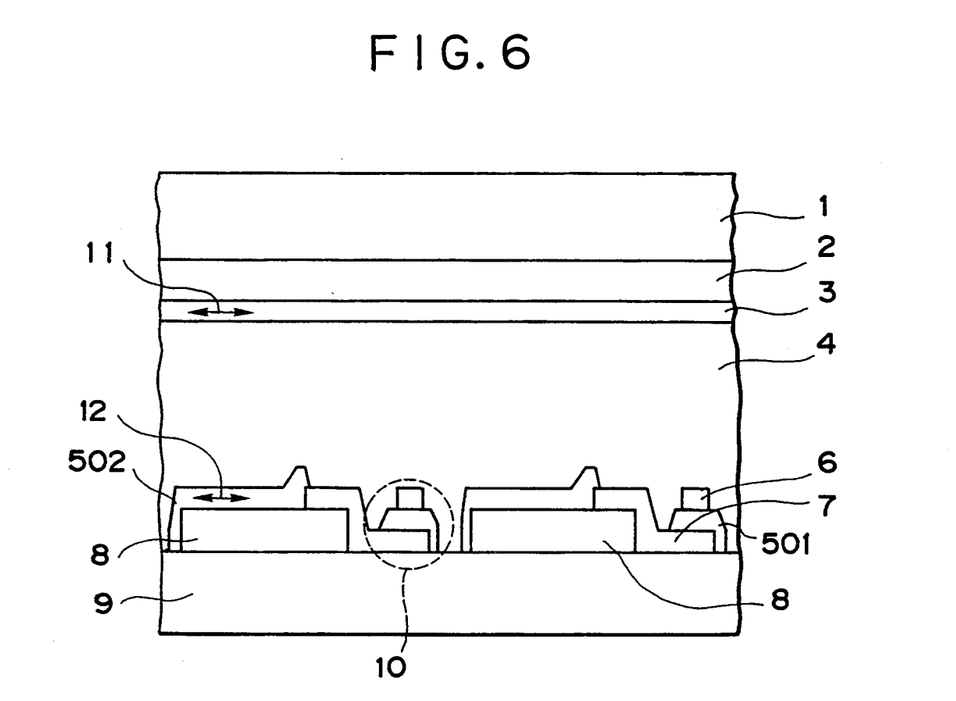
FIG. 6 is a partial cross section of a display panel according to a comparative example.

FIG. 6 shows Comparative Example 1. Comparative Example 1 is the same as Example 1 except that an LB film corresponding to the LB film 5 shown in FIG. 1 is subjected to patterning and divided into an LB film 501 that functions as an insulating layer for the MIM device and an LB film 502 that functions as an insulating layer for preventing an electrical short from being caused between the upper and lower substrate electrodes by a high electric field applied to FLC. In the patterning of the LB film, deep UV exposure was used. The presence or absence of abnormality in reversal threshold values in picture elements of plural ferroelectric liquid crystal cells of Example 1 and Comparative Example 1 was compared under observation with a polarising microscope to reveal that, in Example 1, 4% of picture elements based on the number of observed picture elements had only a slight abnormality in reversal threshold values in picture elements but on the other hand, in Comparative Example 1, the abnormality in reversal threshold values was seen in 20% of the picture elements.

The above result that Comparative Example 1 showed poorer characteristics than Example 1 can be presumed due to the fact that in Comparative Example 1 a greater part of the picture elements has no monomolecular film or its built-up film to have no function of aligning FLC and hence the alignment around picture elements is disordered.

Comparative Example 2

A liquid crystal device of Comparative Example 2 was prepared in the same manner as in Example 1 except that the ferroelectric liquid crystal used was replaced with a TN (twisted nematic) liquid crystal and the drawing-up directions of the LB films provided on the upper and lower substrates fell substantially at right angles.

In Example 1, used was the FLC characterized by having the bistability that the two stable states undergo transition with clear threshold values to pulse voltages, and hence a high display quality level was achieved because of prevention of the lowering of display quality level as typified by crosstalk or flicker and a decrease in contrast, caused by "imperfectness" in the function of retaining voltages applied to the liquid crystal layer. This lowering of display quality level results from the non-linearity characteristics of the MIM device that are said to be imperfect compared with TFT transistors.

On the other hand, in Comparative Example 2 in which the TN liquid crystal was used, the TN liquid crystal had no memory performance and also no clear threshold values to voltages, and hence a decrease was caused in the voltage applied across the electrodes between which the liquid crystal layer was held. This results from the imperfect non-linearity characteristics of the MIM device. A decrease in contrast was also seen when the duty ratio in matrix drive was increased. At the same time, similarly resulting from the imperfect non-linearity characteristics of the MIM device, the crosstalk occurred. Thus, the device had a display quality level inferior to that of Example 1.

In Example 1, on the other hand, the drive conditions were governed by a capacity $C_{MIM}$ of the MIM device portion, a capacity $C_{FLC}$ of the picture element area and a threshold voltage of the MIM device portion, and hence it became possible to effect driving almost without influence of the undesirable temperature characteristics resulting from the temperature characteristics of reversal threshold values of the ferroelectric liquid crystal.

As having been described above, the present invention has made it possible to provide a ferroelectric liquid crystal device having an MIM device, at a low cost and a high display quality level, and a ferroelectric liquid crystal device having satisfied uniform alignment, free from faulty switching regardless of picture element areas and non-picture element areas.

What is claimed is:

1. A liquid crystal device, comprising: a pair of substrates, either having a plurality of electrodes including picture element electrodes and a liquid crystal layer having a chiral smectic phase provided between said substrates, wherein a first substrate of said pair of substrates comprises:
   (i) a plurality of first electrodes dividedly disposed to partially overlap said picture element electrodes, said plurality of first electrodes being covered with a continuous monomolecular or monomolecular built-up film; and
   (ii) a plurality of second electrodes provided on said continuous monomolecular or monomolecular built-up film in areas other than over said picture element electrode such that a MIM device is formed where said first electrodes, said monomolecular or monomolecular built-up film and said second electrodes overlap in layers.

2. A liquid crystal device according to claim 1, wherein an aligning film is further provided on said monomolecular film or monomolecular built-up film and said plurality of second electrodes.

3. A liquid crystal device according to claim 1, wherein said monomolecular film or monomolecular built-up film formed has been obliquely irradiated with an ion beam.

4. The liquid crystal device according to claim 1, wherein said liquid crystal layer has a chiral smectic phase.

5. The liquid crystal device according to claim 4, wherein said liquid crystal layer exhibits said chiral smectic phase.

* * * * *

UNITED STATES PATENT AND TRADEMARK OFFICE
CERTIFICATE OF CORRECTION

PATENT NO. : 5,347,379
DATED : September 13, 1994
INVENTOR(S) : HIDEYUKI KAWAGISHI, ET AL.

It is certified that error appears in the above-indentified patent and that said Letters Patent is hereby corrected as shown below:

ON TITLE PAGE

In [56] References Cited, under U.S. PATENT DOCUMENTS:
"Goddes et al." should read --Geddes et al.--.

In [57] ABSTRACT, Line 5:
"comprises;" should read --comprises:--.

COLUMN 3

Line 58, "(Langmuir-Brodgett)" should read
--(Langmuir-Blodgett)--.

COLUMN 6

Line 38, "θdion" should read --θion--.
Line 65, "highly" should read --high--.

COLUMN 7

Line 32, "a" should read --an--.

COLUMN 9

Line 32, "either having" should be deleted.

UNITED STATES PATENT AND TRADEMARK OFFICE
CERTIFICATE OF CORRECTION

PATENT NO. : 5,347,379

DATED : September 13, 1994

INVENTOR(S) : HIDEYUKI KAWAGISHI, ET AL.

It is certified that error appears in the above-indentified patent and that said Letters Patent is hereby corrected as shown below:

COLUMN 10

Line 13, "electrode" should read --electrodes--.

Signed and Sealed this

Twenty-fifth Day of April, 1995

Attest:

BRUCE LEHMAN

*Attesting Officer*   *Commissioner of Patents and Trademarks*